United States Patent Office 3,005,827
Patented Oct. 24, 1961

3,005,827
INDOLE COMPOUNDS
Uberto Teotino and Giulio Maffii, Milan, Italy, assignors to Lepetit S.p.A., Milan, Italy
No Drawing. Filed Jan. 5, 1960, Ser. No. 667
Claims priority, application Great Britain Jan. 5, 1959
6 Claims. (Cl. 260—319)

This invention is concerned with new indole compounds. More particularly, the compounds of this invention correspond to the following general formula

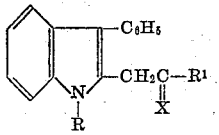

wherein R represents a lower alkyl radical, X represents oxygen or $H_2$, and $R^1$ represents an amino, alkylamino, dialkylamino, dialkylaminoalkoxy, hydrazino or substituted hydrazino group.

The compounds of the above formula and the quaternary addition salts prepared therefrom when a tertiary amino group is present, have proved of great utility as ganglionic blocking agents, anti-fibrillatory agents and hypotensives.

The compounds of the above formula in which X is oxygen, being amides and esters of 1-alkyl-3-phenyl-2-indoleacetic acid are prepared starting either from a 1-alkyl-3-phenyl-2-indoleacetic acid chloride or alkyl ester, which is reacted with the selected primary or secondary amine or with the hydrazine or dialkylaminoalkanol under conventional reaction conditions. When a substituted hydrazine is desired, the 1-alkyl-3-phenyl-2-indoleacethydrazide prepared according to said process is condensed with a carbonyl compound, thus obtaining a 1-(1-alkyl-3-phenyl-2-indoleacetyl)-2-alkylidenehydrazine, which on reduction gives the corresponding 2-alkylhydrazine:

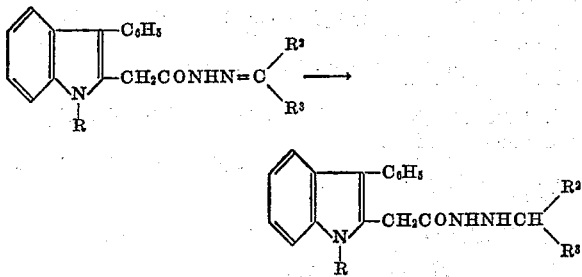

wherein $R^2$ and $R^3$ represent alkyl radicals.

The compounds in which X is $H_2$ are prepared by hydrogenating the corresponding amides with $LiAlH_4$.

The quaternary addition salts of the compounds bearing a tertiary nitrogen atom are simply prepared from the amine and the selected alkyl halide by conventional procedures.

The following non-limitative examples are illustrative of the invention.

EXAMPLE 1

*Ethyl 1-methyl-3-phenyl-2-indoleacetate*

To a mixture of 8.24 g. of ethyl phenylacetoacetate, 5.44 g. of sodium acetate and 80 ml. of acetic acid, a suspension of 6.84 g. of 1-phenyl-1-methyl hydrazine sulfate in 20 ml. of water is added and the mixture is refluxed for 30 minutes with stirring. After cooling and addition of 400 ml. of water the supernatant oil is extracted with ethyl ether. After removing the solvent the residue is recrystallized from methanol. Yield 9 g., M.P. 78°.

EXAMPLE 2

*1-methyl-3-phenyl-2-indoleacetic acid*

15 g. of ethyl 1-methyl-3-phenyl-2-indole acetate, 6 g. of 50% of sodium hydroxide and 150 ml. of ethanol are refluxed for 2 hours. The solution is concentrated to one half of its volume, cooled, diluted with 150 ml. of water and made acidic with hydrochloric acid. The separated white crystals are collected and recrystallized from ethanol. Yield 13 g., M.P. 142°.

EXAMPLE 3

*1-methyl-3-phenyl-2-indoleacetylchloride*

A mixture of 5 g. of 1-methyl-3-phenyl-2-indoleacetic acid, 250 ml. of anhydrous ethyl ether and 2.8 ml. of thionyl chloride are allowed to stand for 2 days at 0–5° and then it is evaporated to dryness in vacuo. The residue is dissolved in ethyl ether and this solution is used for the following reactions.

EXAMPLE 4

*N,N-dimethyl-1-methyl-3-phenyl-2-indoleacetamide*

To a solution of 1-methyl-3-phenyl-2-indoleacetylchloride (prepared from 7.5 g. of the acid) in 200 ml. of anhydrous ethyl ether there is added under stirring and cooling a solution of 4 ml. of dimethylamine in 20 ml. of anhydrous ethyl ether. After 15–20 hours the precipitate so formed is collected and recrystallized from ethanol giving 6.2 g. of the product. M.P 140–141°.

EXAMPLE 5

*N,N-diethyl-1-methyl-3-phenyl-2-indoleacetamide*

Prepared by the process of Example 4 from 5.8 ml. of diethylamine dissolved in 20 ml. of anhydrous ethyl ether. Yield 6 g., M.P. 110–111°.

EXAMPLE 6

*N-methyl-1-methyl-3-phenyl-2-indoleacetamide*

A mixture of 3 g. of ethyl 1-methyl-3-phenyl-2-indoleacetate and 30 ml. of ethanol containing 25% of methylamine is allowed to stand for 2 days to form a crystalline precipitate which is collected and recrystallized from ethanol. Yield 2.6 g., M.P. 216–217°.

EXAMPLE 7

*β-Dimethylaminoethyl 1-methyl-3-phenyl-2-indoleacetate hydroxide*

A mixture of 40 ml. of β-dimethylaminoethanol and 8 g. of ethyl 1-methyl-3-phenyl-2-indoleacetate is refluxed for 6 hours in the presence of a trace of sodium. The unreacted aminoalcohol is distilled off and the residue is treated with ethyl ether. Hydrogen chloride is bubbled in, the precipitate formed is collected, dissolved in water, made alkaline with 50% potassium hydrochloride, extracted with ethyl ether and again treated with hydrogen chloride. The precipitate is collected. Yield 7 g., M.P. 172–174°.

The above hydrochloride is dissolved in a small amount of water, made alkaline with 30% potassium hydroxide and extracted with ethyl ether. This solution is treated with an equivalent amount of methyl iodide. The mixture is allowed to stand for 2 days, the precipitate is collected and recrystallized twice from ethanol-acetone. The obtained methyl iodide melts at 162–163°.

EXAMPLE 8

β-Dimethylaminoethyl 1-methyl-3-phenyl-2-indoleacetate hydrochloride

Prepared as described above for the analogous β-dimethylaminoethylester from 6 g. of ethyl 1-methyl-3-phenyl-2-indoleacetate and 25 ml. of β-diethylaminoethanol. Yield 6 g., M.P. 184–185°. The methyl iodide melts at 154–155°.

EXAMPLE 9

1-methyl-3-phenyl-2-indoleacethydrazide

A mixture of 10 g. ethyl 1-methyl-3-phenyl-2-indoleacetate, 5 ml. of hydrazine hydrate and 20 ml. of ethanol is refluxed for 12 hours. On cooling 7 g. of white product separate and are collected. M.P. 207–208°.

EXAMPLE 10

1-(1-methyl-3-phenyl-2-indoleacetyl)-2-isopropylidenehydrazine

A mixture of 5 g. of 1-methyl-3-phenyl-2-indoleacethydrazide and 50 ml. of anhydrous acetone is refluxed for 4 hours, then it is cooled, filtered free from solids and concentrated to ¼ of its volume. On cooling a product separates which is collected and recrystallized from acetone. Yield 4.5 g., M.P. 190°.

EXAMPLE 11

1-(1-methyl-3-phenyl-2-indoleacetyl)-2-isopropylhydrazine

A mixture of 3 g. of 1-(1-methyl-3-phenyl-2-indoleacetyl)-2-isopropylidenehydrazine, 50 ml. of anhydrous ethanol and 0.1 g. of $PtO_2$ is hydrogenated under 5 atmospheres of hydrogen at 70°. The mixture is filtered hot and the filtrate is cooled. The precipitate is collected. Yield 2.5 g., M.P. 190–191°.

EXAMPLE 12

N,N-dimethyl-β-(1-methyl-3-phenyl-2-indolyl)-ethylamine hydrochloride

Three grams of N,N-dimethyl-1-methyl-3-phenylindoleacetamide are refluxed with 0.7 g. of $LiAlH_4$ in 50 ml. of anhydrous ethyl ether for 5 hours. After cooling, some sulfuric acid is cautiously added and the precipitate is collected and dissolved in hot water. On cooling, 3.2 g. of the sulfate of the desired product separate and are recrystallized from ethanol. M.P. 119–124° (135–138° after drying in vacuo at 100°). The sulfate is converted into the hydrochloride by treatment with potassium hydroxide, extraction with ethyl ether and bubbling of hydrogen chloride into the ether solution. M.P. 239–240°.

EXAMPLE 13

N,N,N-trimethyl-β-(1-methyl-3-phenyl-2-indolyl)-ethyl ammonium iodide

A water suspension of 2.7 g. of N,N-dimethyl-β-(1-methyl-3-phenyl-2-indolyl)-ethylamine hydrochloride is made alkaline with potassium hydroxide. The mixture is extracted with ethyl ether and treated with 1.7 ml. of methyl iodide. After 2 days the precipitate is collected and recrystallized from anhydrous ethanol. Yield 2.9 g., M.P. 247–249°.

EXAMPLE 14

N,N-diethyl-β-(1-methyl-3-phenyl-2-indolyl)-ethylamine hydrochloride

Prepared as described above for the N,N-dimethyl analogue from 1.2 g. of $LiAlH_4$ and 6 g. of N,N-diethyl-1-methyl-3-phenyl-2-indoleacetamide in 100 ml. of anhydrous ethyl ether. Yield 4.7 g., M.P. 203–204°.

EXAMPLE 15

N-methyl-N,N-diethyl-β-(1-methyl-3-phenyl-2-indolyl)-ethyl ammonium iodide

Prepared as described above for the N,N-dimethyl analogue from 2.5 g. of N,N-diethyl-β-(1-methyl-3-phenyl-2-indolyl)-ethylamine hydrochloride and 1.4 g. of methyl iodide. Yield 2.1 g. M.P. 203–204°.

We claim:
1. A compound of the formula

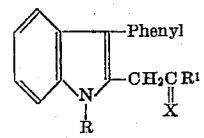

wherein R is a lower alkyl radical, X is a member of the class consisting of oxygen and $H_2$, and $R^1$ is a member of the class consisting of amino, lower alkylamino, lower dialkylamino, lower dialkylaminoalkoxy, hydrazino and lower alkyl-substituted hydrazino groups.

2. β-Dimethylaminoethyl 1-methyl-3-phenyl-2 - indoleacetate hydrochloride.

3. β-Dimethylaminoethyl 1 - methyl-3-phenyl-2-indoleacetate methyl iodide.

4. 1-methyl - 3 - phenyl - 2 - (β - dimethylaminoethyl)-indole methyl iodide.

5. 1-methyl - 3 - phenyl - 2 - (β - diethylaminoethyl)-indole methyl iodide.

6. 1-methyl - 3 - phenyl - 2 - (β - dimethylaminoethyl)-indole hydrochloride.

References Cited in the file of this patent
UNITED STATES PATENTS
2,870,162    Speeter et al. _____ Jan. 29, 1959